United States Patent [19]

Stieg

[11] Patent Number: 4,534,232
[45] Date of Patent: Aug. 13, 1985

[54] ALTERNATING ROTARY TO RECIPROCATING ACTUATOR

[75] Inventor: Richard F. Stieg, Boulder, Colo.

[73] Assignee: The Gates Rubber Company, Denver, Colo.

[21] Appl. No.: 577,435

[22] Filed: Feb. 6, 1984

[51] Int. Cl.³ ............................................. F16H 27/02
[52] U.S. Cl. .................................. 74/89.2; 74/99 R; 474/12
[58] Field of Search ............... 74/99 R, 89.2; 474/8, 474/12, 17, 37

[56] References Cited

U.S. PATENT DOCUMENTS

| | | | |
|---|---|---|---|
| 2,027,386 | 1/1936 | Krümmer | 74/99 |
| 3,548,225 | 12/1970 | Vit | 74/99 R |
| 3,864,983 | 2/1975 | Jacobsen | 74/89 |

Primary Examiner—Martin P. Schwadron
Assistant Examiner—Stephen M. Hepperle
Attorney, Agent, or Firm—H. W. Oberg, Jr.; C. H. Castleman, Jr.

[57] ABSTRACT

An alternating rotary to reciprocating type actuator with two axially spaced disc members that each have a plurality of circumferentially spaced rim grooves. A cord is wound in zig-zag fashion between the disc members and in the grooves to define a plurality of similarly arranged links that interconnect the disc members.

3 Claims, 6 Drawing Figures

ALTERNATING ROTARY TO RECIPROCATING ACTUATOR

BACKGROUND OF THE INVENTION

The invention relates to mechanisms for mechanical movements, but more particularly, the invention relates to an actuator with reciprocating motion to or from alternating rotary motion.

Several types of mechanisms are available for converting rotary motion to linear motion or linear motion to rotary motion. As examples, such mechanisms include racks and pinions, cams, cranks, and hydraulics using piston-cylinder type combinations. Inherent friction of such mechanisms affect response and efficiency while also introducing associated undesirable characteristics such as noise and the requirement for lubrication.

Examples of alternating rotary to reciprocating type actuators that appear to overcome the drawbacks of friction, poor efficiency, requirement for lubrication, and noise are shown in U.S. Pat. 3,864,983 and U.S. patent application Ser. No. 335,981. These actuators are characterized by at least two coaxially arranged disc type members that are interconnected along their rims by a plurality of similarly oriented links formed of cords. One of the disc members is permitted to rotate about an axis longitudinally along an axis in relation to the other disc member. Relative rotation of one disc member in one direction tensions the cords pulling the disc members together and shortening the axial spacing between the disc members. Rotation in the opposite direction decreases cord tension and increases the axial spacing between the disc members. While such actuators overcome disadvantages of prior art actuators, they also introduce their own problems such as attachment of the cords to the disc members without inflicting cord damage; unequal length cords that cannot substantially evenly share tensile loads; spacing the cords circumferentially along the rims of the disc members; and sharp bends in the cords that introduce flexural fatigue.

SUMMARY OF THE INVENTION

In accordance with the invention, an alternating rotary to reciprocating type actuator is provided and is illustrated for use with a variable speed pulley. The actuator is of the type with at least two coaxial disc-type members that are interconnected along their rims with a plurality of similarly oriented cords. The disc members are operatively interconnected between halves of the variable speed pulley.

Each disc member has a rim portion with circumferentially spaced, cord receiving, concave grooves. Grooves in the inward facing sides of one disc member are oriented in paired alignment with similar grooves of the other disc member, and grooves on outward facing sides of each disc member are in paired alignment with each other. A cord is laced in zig-zag fashion between the disc members in a predetermined pattern. The zig-zag lacing minimizes the number of cords that must be used to form the individual links and the grooves simplify the means for attaching the cords to the disc while also permitting the cords to stabilize to approximately equal lengths. Additional means, such as a cup-shaped retainer, may be attached over the disc rims to keep the cord in the grooves.

The invention is further described by way of example with reference to the accompanying drawings, in which.

DESCRIPTION OF PREFERRED EMBODIMENT

Figure 1:
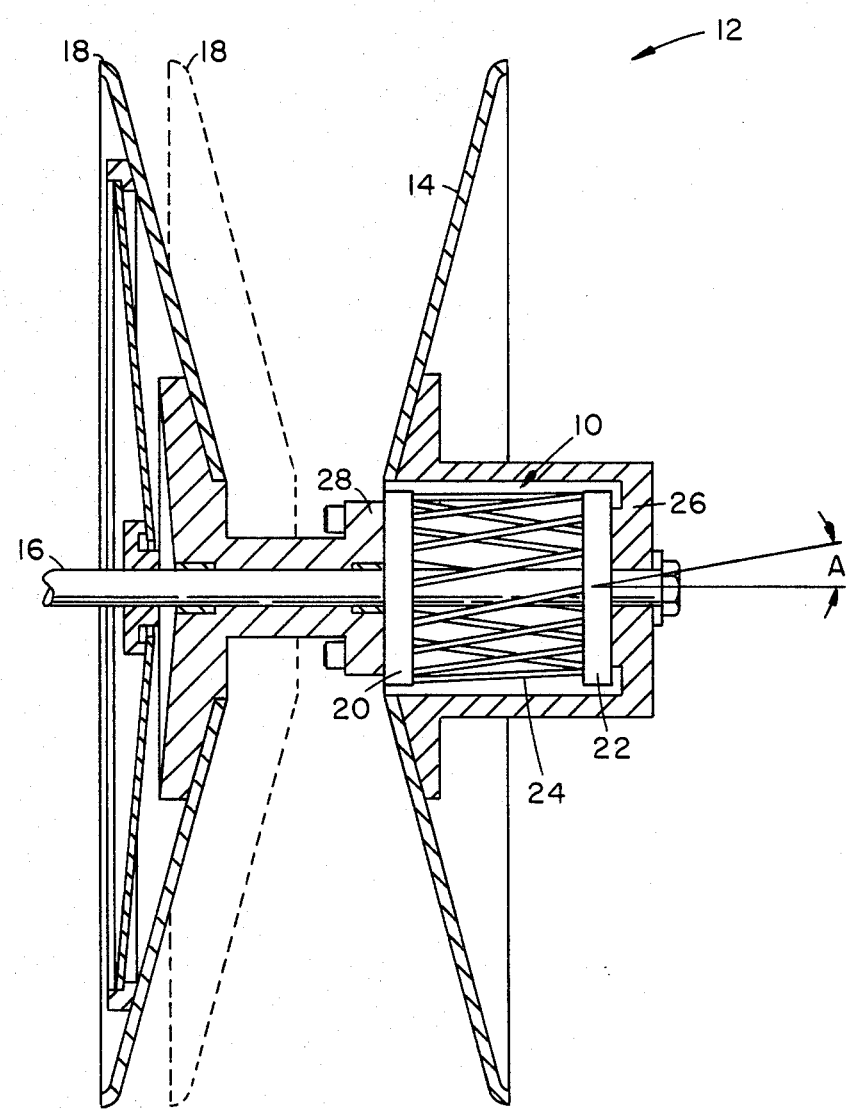
FIG. 1 is a partially cutaway, partially cross-sectional view of a variable speed pulley that incorporates an actuator of the invention.
Figure 2:
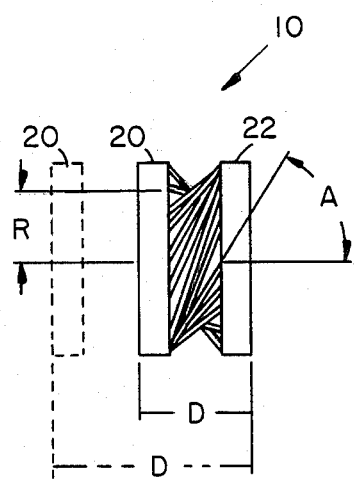
FIG. 2 is a view of the actuator as broken away from FIG. 1 and showing the actuator in an activated position.

Referring to FIGS. 1 and 2, an actuator 10 of the invention is shown in use with a variable speed pulley 12 as its torque sensing mechanism. The variable speed pulley has a fixed pulley half 14 that is coaxial with and fixedly attached to rotate with a shaft 16. A movable pulley half 18 is coaxial with the shaft and is free to both rotate and axially move on the shaft toward and away from the fixed pulley half on bearings. The movable pulley half is controlled by the actuator which has two disc type members 20, 22 that are interconnected with a plurality of similarly arranged links 24, that surround the shaft. The links are formed of cable or cord and end portions of the cords or links are radially spaced from the shaft at some desired radius R and are oriented at some desired angle A whereby the locus by the disc members of the cords gives the appearence of a hyperboloid of revolution. One disc member 22 is fixed in relation to the shaft such as by means of an end plate 26 that is attached to the fixed pulley half. The other disc 20 member is attached to the movable pulley half such as by means of an end plate 28. When the movable pulley half is rotated along the shaft with respect to the fixed pulley half, the cords somewhat "wind up" which decreases the radius R, shortens the axial distance D between the pulley halves, and increases the cord angle A. Such displacement of the movable pulley half positions an entrained belt, not shown, toward the maximum pulley diameter. Conversely, a wedging action by the belt forces the pulley halves apart toward the minimum pulley diameter which "unwinds" the cords to lengthen the axial distance between the pulley halves.

Figure 3:
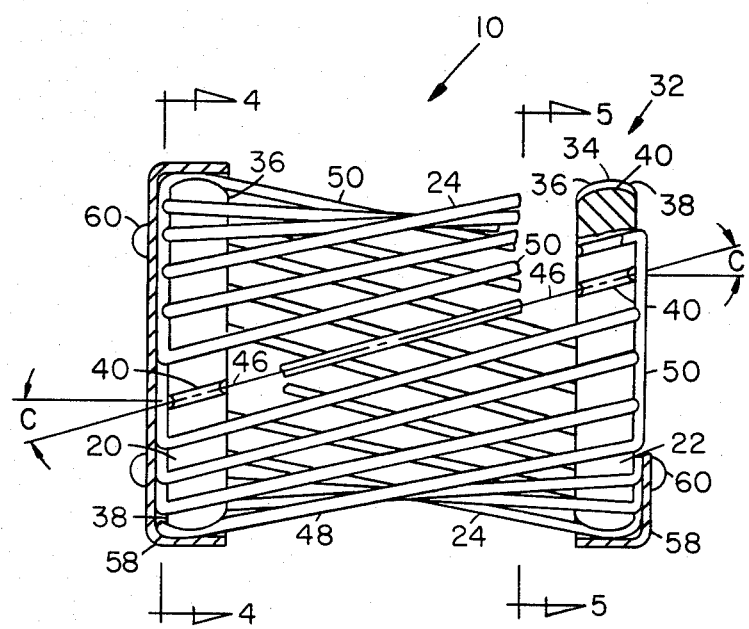
FIG. 3 is an enlarged view of the actuator as broken away from FIG. 1 showing the actuator partially broken away and partially in cross section.
Figure 4:
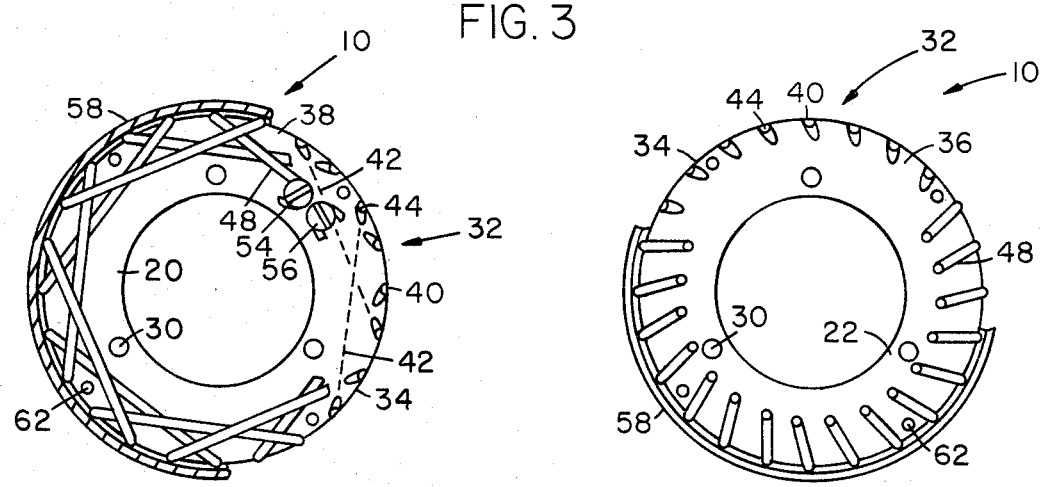
FIG. 4 is a view taken along the line 4—4 of FIG. 3.
Figure 5:
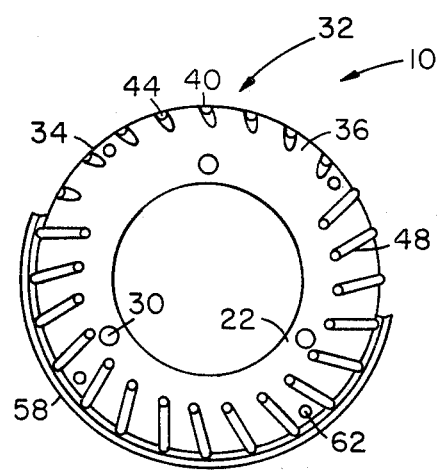
FIG. 5 is a view taken along the line 5—5 of FIG. 3.

Referring to FIGS. 3–5, the actuator 10 of the invention is shown in detail. The two disc-type members 20, 22 are coaxially spaced from each other. One of the disc members is free to rotate and axially move toward the other disc member. As shown in FIG. 1, the disc member attached to the movable pulley half is free to rotate about the shaft and move axially along the shaft. The disc member attached to the other pulley half is fixed to rotate with the shaft. Some means such as threaded fasteners and tapped holes 30 are used to attach the disc members to the end plates of the fixed and movable pulley halves.

The disc members may have different diameters, but preferably, the disc members have substantially equal diameters. Each disc member has a rounded type rim 32 that defines a circumferential portion 34 interconnecting an inside sidewall portion 36 and an outside sidewall portion 38. Each rim has a plurality of circumferentially spaced, convex grooves 40 that individually extend into an interconnected inside sidewall portion at projected angles C that are substantially equal and helically oriented. The helical angles of the grooves of each disc member are substantially equal when the disc members have substantially equal diameters. When different diameter dics are chosen, the helical angles of the groove of each individual disc will be equal to each other but the helical angles of the two discs will be different.

The grooves individually extend into an interconnected outside sidewall portion where each groove is oriented in a predetermined chordal alignment 42 with another of such grooves.

The minimum radius of curvature of the convex grooves from the rim portion to the inside surface is selected to be larger than the bend radious associated with early flexural fatigue of the chosen cord. A radius of curvature at least equal to about 5.5 times the cord diameter is usually satisfactory.

The depth 44 of the grooves at the rim portion is preferably at least equal to one half the chosen cord diameter, and more preferably, is at least equal to the cord diameter. The so-formed grooves transfer troque from the disc members to the cord without inflicting damage to the cord.

The disc members are arranged with their inside sidewall portions facing each other with the helically oriented grooves of one disc generally in individual alignment 46 with similar individual grooves of the other disc. The helical angle for each disc member is chosen for such alignment that permits one disc member to have a desired helical angle A which results from prerotation of one disc member in relation to the other disc member. For example, the disc members may be prerotated about their common axis at an angle from about 50 to about 110 degrees in relation to each other.

A cord 48 is interlaced in zig-zag fashion 50 between the discs and in the grooves such that the cord forms a plurality of substantially similarly arranged, equal length links 24 between the two disc members. The cord may be made of any desirable material, but preferably, the cord is made of a substantially nonextensible material such as twisted aramid fiber. The cord may be covered with an elastic material such as polyurethane to inhibit fraying.

Figure 6:
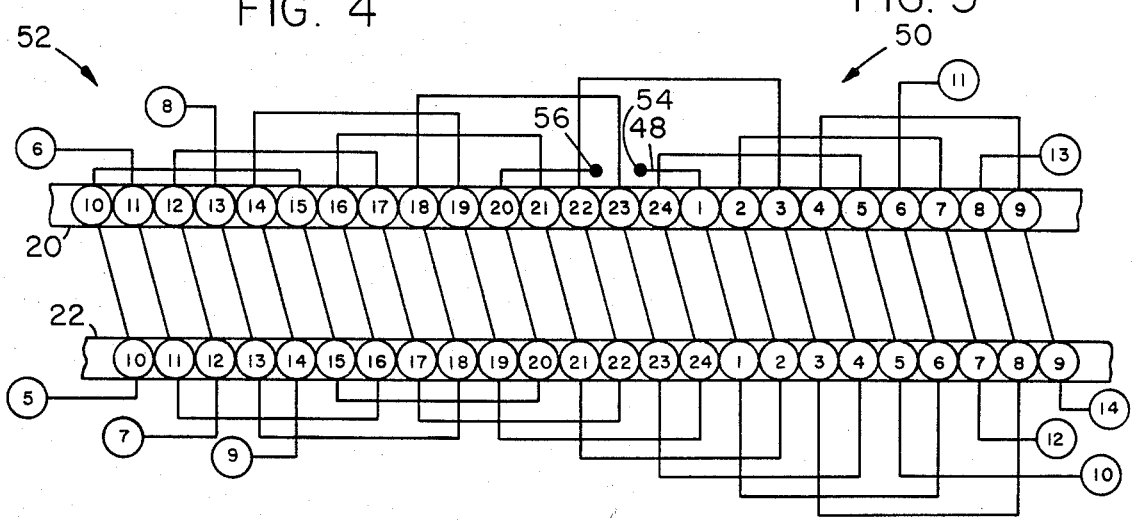
FIG. 6 is a schematic of the actuator developable surface showing how a single cord may be interlaced between the disc members to define a plurality of similarly arranged links between the two disc members.

FIG. 6 illustrates how the cord is interlaced in zig-zag fashion.

FIG. 6 shows a schematical developabale surface 52 of the actuator where each groove of each disc member is sequentially numbered and encircled. Broken portions of the cord are also identified with encircled numbers that correlate the broken cord portions with a particular groove.

When a single cord is used, one end of the cord may be attached to one of the disc members with some fastening means such as a threaded fastener 54. As illustrated, the cord is wound in zig-zag fashion by skipping five grooves on the outside rim portion. The winding process is continued until all cords are wound into position with the cord on the outside rim portion overlapping each other as shown in FIG. 4. The free end of the cord used for interlacing is then secured to one of the members such as by another threaded fastener 56. As illustrated, the free end comes from the groove with encircled number 20 (FIG. 6) and is secured with a threaded fastener 56 (FIG. 4).

Instead of using fasteners to tie down the cord ends, the ends may be tied together to form one endless cord. Of course, more than one cord could be used to wind between the disc member in zig-zag fashion. For example three cords could be used. However, one cord is preferred because it is easier to make the links be substantially equal in length.

The cords will remain in the grooves so long as the links are tensioned. For handling reasons, it is preferred that each disc member include a means for retaining the wound cord to the rims of the disc members. As shown in FIG. 3, such a means may be in the form of a retaining cup 58 having circumferential portions that slides over the rims. The cup is held in place by fasteners 60 threaded into 62 the disc members.

Optionally, the so-formed actuator may be cycled several times under load before the retaining cups are installed. This permits the cords to somewhat equalize in length under tension and further ensure that the cords forming the links are substantially equal. The cups help retain equal cord length by clamping the overlapped cord at the outside rim portion.

To further illustrate by way of example, an actuator for a 9.8 inch diameter variable speed pulley with a 5:1 variation rated at 238 lb.-ft. maximum torque, was constructed with the following characteristics:

| | |
|---|---|
| Disc diameter, in. | 3.52 |
| No of grooves | 24 |
| Groove helical angle, deg. | 18.43 |
| Max. groove depth at rim, in. | .062 |
| Min. convex radius at rim, in. | .25 |
| Cord type | Aramid |
| Cord modulus, psi | $8 \times 10^6$ |
| Cord covering | Polyurethane |
| Cord diameter, in. | .045 |
| No of cords | 1 |

The actuator was operated with a maximum axial load of 675 lbs. for 50,000 full cycles without actuator failure.

In operation, the wedging action of a V-belt operates to spread the pulley halves apart by displacing the movable pulley half. This has the effect of tensioning the links. The actuator, when attached to the movable pulley half, performs two functions; it either increases tension in the links to support increased belt tension or, if there is not pulley half movement, it permits rotation of the disc members to the point where belt tension is balanced against link tension and the movable pulley half is displaced. If the cords are just tensioned, the axial force generated by the actuator increases and there is no movement of the movable pulley half towards the fixed pulley half. However, if sensed torque is such that the movable pulley half may rotate with respect to the fixed pulley half, the disc members are angularly rotated relative to each other shortening the distance between the pulley halves which has the effect of changing the pulley pitch diameter. As the disc members are rotated, the links are arcuately displaced, radius between the links and the shafts become smaller and the angle between the links and shafts become larger.

The foregoing description is made for purpose of illustration only and it is not intended to limit the scope of the invention which is to be determined from the appended claims.

What is claimed is:

1. An alternating rotary to reciprocating type actuator comprising:

two disc type members, each having a rounded type rim that defines a circumferential portion interconnecting an inside sidewall portion and an outside sidewall portion, each circumferential portion having a plurality of circumferentially spaced convex grooves that individually extend into an interconnected inside sidewall at projected angles that are substantially equal and helically oriented, said grooves also individually extending into an interconnected outside sidewall portion where each groove is oriented in a predetermined chordal alignmemt with another of such grooves, the two disc members coaxially spaced from each other with at least one disc member free to rotate and axially move toward the other disc member, the disc members arranged with their inside sidewall portions facing each other with the helically oriented grooves of one disc generally in individual lineal alignment with similar individual grooves of the other disc; and a cord interlaced in zig-zag fashion between said discs in said grooves such that the cord forms a plurality of substantially similarly arranged links between the two disc members.

2. The actuator as claimed in claim 1 which further includes means for retaining the cord to the rims of the disc members.

3. The actuator as claimed in claim 1 wherein the cord has ends and the actuator further includes means for retaining the ends to at least one disc member.

* * * * *